UNITED STATES PATENT OFFICE.

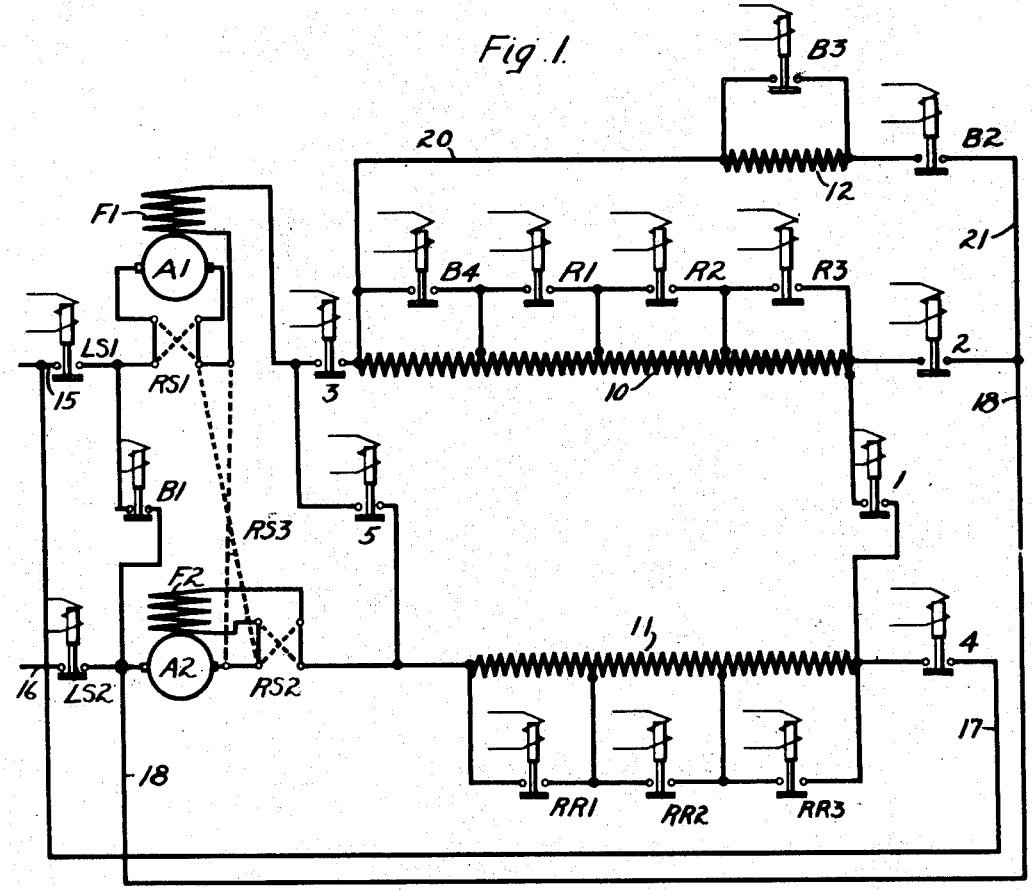

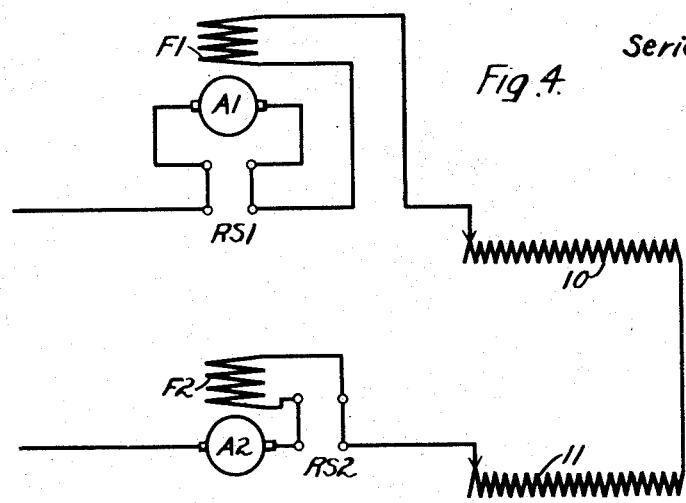
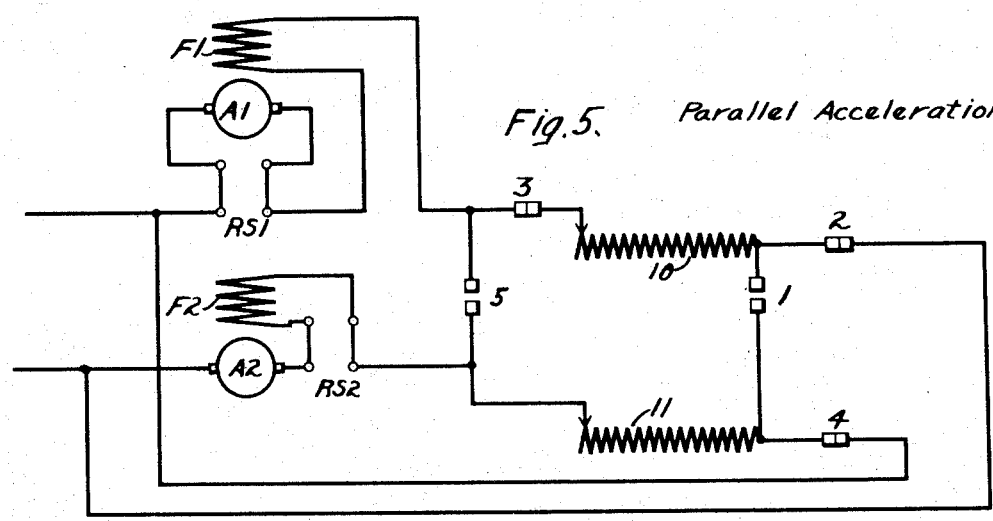
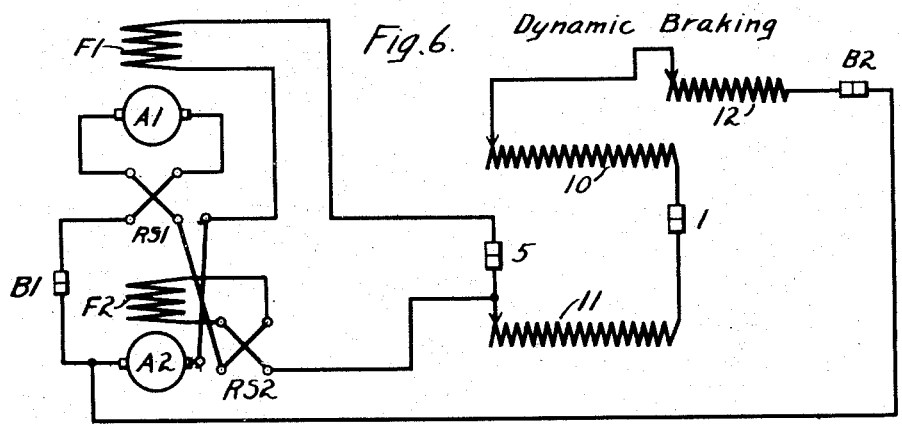

ANDREW H. CANDEE, OF PITTSBURGH, AND HOWARD H. JOHNSTON, OF EDGEWOOD PARK, PENNSYLVANIA, ASSIGNORS TO WESTINGHOUSE ELECTRIC & MANUFACTURING COMPANY, A CORPORATION OF PENNSYLVANIA.

SYSTEM OF CONTROL.

1,317,266.  Specification of Letters Patent.  Patented Sept. 30, 1919.

Application filed October 3, 1917. Serial No. 194,434.

*To all whom it may concern:*

Be it known that we, ANDREW H. CANDEE, a citizen of the United States, and a resident of Pittsburgh, in the county of Allegheny and State of Pennsylvania, and HOWARD H. JOHNSTON, a citizen of the United States, and a resident of Edgewood Park, in the county of Allegheny and State of Pennsylvania, have invented a new and useful Improvement in Systems of Control, of which the following is a specification.

Our invention relates to systems of control and especially to electric-railway motor systems that are adapted for both acceleration and electrical braking.

The object of our invention is to provide a relatively simple and inexpensive system of the above-indicated character for effecting series-parallel acceleration and suitable dynamic braking with the momentum-driven machine connected in parallel relation.

More specifically stated, it is the object of our invention to provide a system of the character in question wherein a resistor is connected in circuit with each machine during series-parallel acceleration, while the machines are connected in parallel relation for dynamic braking purposes with the accelerating resistors and an additional resistor in series relation with the machines, the entire operation being performed with a relatively small number of switches.

Our invention may best be understood by reference to the accompanying drawings, wherein Figure 1 is a diagrammatic view of the main circuits of a system of control embodying the invention; Fig. 2 and Fig. 3 are sequence charts of well-known form, indicating the preferred order of operation of the various switches during the acceleration and the braking periods, respectively; and Fig. 4, Fig. 5 and Fig. 6 are simplified diagrammatic views, corresponding to series acceleration, parallel acceleration and dynamic braking, respectively.

Referring to Fig. 1 of the drawings, the system shown comprises suitable direct-current supply-circuit conductors 15 and 16 which are respectively marked with a plus sign and a minus sign; a plurality of dynamo-electric machines having commutator-type armatures A1 and A2 and field windings F1 and F2 of the series type; reversing-switch contact members, here shown in a conventional manner and designated as RS1 and RS2, for respectively reversing the connections of the armature A1 and of the non-corresponding field winding F2; another reverser or change-over switch RS3 for interconnecting non-corresponding armatures and field windings under braking conditions; a plurality of variable resistors 10 and 11, which are employed during both acceleration and dynamic braking operations; a third variable resistor 12, which is utilized only during the braking period; and a plurality of electrically-controlled switches LS1, LS2, 1 to 5, inclusive, R1, R2, R3, RR1, RR2, RR3, B1, B2, B3, and B4.

Assuming that it is desired to effect acceleration of the illustrated system, a suitable governing controller (not shown) may be thrown to its initial operative position corresponding to the step *a* of the sequence chart, Fig. 2, whereby switches LS1, LS2, 1, 3 and B4 are closed. A circuit is thus established from the positive supply-circuit conductor 15 through switch LS1, reversing switch RS1, armature A1, field winding F1, switch 3, three sections of the resistor 10, since the switch B4 is closed, switch 1, entire resistor 11, reversing switch RS2, field winding F2, armature A2 and the switch LS2 to the negative supply-circuit conductor 16.

The machines are thus connected in series-circuit relation with the resistors 10 and 11, as illustrated in a simplified manner in Fig. 4. The switch B4 is closed to short-circuit a predetermined section of the resistor 10, and thus the active portions of the resistors 10 and 11 are substantially equal during the accelerating period, to produce balanced operation of the machines.

In positions *b* to *g*, inclusive, of the governing controller, the resistor short-circuiting switches R1 to RR3, inclusive, are progressively closed to short-circuit corresponding sections of the accelerating resistors 10 and 11 and thus gradually increase the speed of the machines until full-series relation is attained.

To effect the well-known "bridging" type of transition to parallel relation of the machines, the resistor-short-circuiting switches are opened, and switch 5 is then closed, as indicated in position $h$, to directly connect the outer terminals of the two field windings F1 and F2. Switches 2 and 4 are next closed, and switches 1 and 5 are then opened to complete the transition.

In position $i$ of the governing controller, therefore, one circuit is established from the positive conductor 15 through conductor 17, switch 4, entire resistor 11, reversing switch RS2, field winding F2, armature A2 and switch LS2 to the negative conductor 16, while a parallel-related circuit is established from the supply conductor 15 through switch LS1, reversing switch RS1, armature A1, field winding F1, switch 3, three sections of the resistor 10, switch 2 and conductor 18 to the negative supply-circuit switch LS2. The simplified circuit connections at this time are shown in Fig. 5.

The resistor short-circuiting switches are then closed in any desired sequence, as indicated in positions $j$, $k$ and $l$ of the sequence chart, to gradually short-circuit the accelerating resistors and cause the machines to reach full-speed relation.

To effect electrical braking operation under such conditions, the reversing switch contact members RS1, RS2 and RS3 are thrown to their reversed or dotted-line positions for purposes to be set forth, and the governing controller is actuated to its initial braking position corresponding to step $a'$ of the sequence chart, Fig. 3, to close switches 1, 5, B1 and B2.

As illustrated in a simplified manner in Fig. 6, the outer terminals of the armatures A1 and A2 are thus directly connected by the switch B1, while the outer terminals of the field windings F1 and F2 are directly joined by the switch 5. The momentum-driven machines are thus connected in parallel relation, the non-corresponding armatures and field windings being inter-connected through the change-over switch RS3 to maintain balanced braking efforts of the two machines, in accordance with familiar principles. By reason of the above-mentioned reversal of the armature A1 and the field winding F2, dynamic braking operation is set up, as subsequently explained, circuit being continued from the switch 5, through entire resistor 11, switch 1, the complete resistor 10, conductor 20, resistor 12, switch B2 and conductors 21 and 18 to the switch B1.

The machines are thus connected in direct parallel relation, while the accelerating resistors 10 and 11 and an additional resistor 12 are connected in series-circuit relation with the generating machines. In this way, a suitable number of smoothly graded braking steps may be provided, as indicated by the sequence chart, Fig. 3.

For instance, in positions $b'$ and $c'$ of the governing controller, switches B3 and B4 are successively closed to respectively short-circuit the additional resistor 12 and one section of the accelerating resistor 10. In the remaining positions $d'$ to $i'$, the switches R1 to RR3, inclusive, are closed in a preferred order to gradually short-circuit the resistors 10 and 11 to maintain the desired value of braking current as the machine speed decreases.

It should be observed that, in our system, a minimum number of switches is utilized to effect the desired operation. Omitting the resistor-short-circuiting switches, the number of which, of course, depends upon operating conditions, and does not relate directly to the invention, a total of only seven "main-circuit" switches, namely, LS1, LS2, and 1 to 5, inclusive, are utilized for series-parallel acceleration, while only two additional switches, B1 and B2, are necessary to complete the desired dynamic-braking connections, wherein the machines are connected in parallel relation and all of the illustrated resistors are connected in series-circuit relation with the machines. Furthermore, switches 2, 3 and 4 are idle during braking conditions so that a total of only four "main-circuit" switches are employed during the retardation period.

Moreover, the location of the switch 5 is particularly advantageous with respect to the desired change-over of circuit connections, and such location forms an important feature of our invention, since, otherwise, one or two more switches would be necessary to effect the desired relations of circuits.

It should be observed that the capability of reversal of one armature winding and a non-corresponding field winding during the braking operation forms another important element of our invention, taken in conjunction with the arrangement of the remainder of the system. Without detailed explanation, it will be understood that the voltage of a momentum-driven armature will build up to the desired value only if the residual magnetism in the armature is assisted at the beginning of the braking period. In the present case, therefore, it follows that the illustrated method of reversal, or its equivalent, is necessary to produce effective braking operation of the parallel-related machines. As previously mentioned, the changeover switch RS3 is provided to inherently balance the loads of the two machines during the retardation period.

We do not wish to be restricted to the specific circuit connections or arrangement of parts herein set forth, as various modifications thereof may be effected without departing from the spirit and scope of our invention. We desire, therefore, that only such limitations shall be imposed as are indicated in the appended claims.

We claim as our invention:

1. In a control system, the combination with a supply circuit and a plurality of dynamo-electric machines, of a plurality of resistors, a plurality of switches for effecting series-parallel acceleration of said machines with a resistor in circuit with each machine, and means including a single additional switch for connecting another resistor in series-circuit relation with the accelerating resistors under predetermined operating conditions.

2. In a control system, the combination with a supply circuit and a plurality of dynamo-electric machines, of a plurality of resistors, a plurality of switches for effecting series-parallel acceleration of said machines with a resistor in circuit with each machine, and means including two additional switches for connecting said machines in parallel relation and connecting another resistor in series-circuit relation with the accelerating resistors to effect dynamic braking operation.

3. In a control system, the combination with a plurality of supply-circuit conductors and a plurality of dynamo-electric machines normally disconnected therefrom, of a plurality of resistors, means including seven "main-circuit" switches for effecting series-parallel acceleration of said machines with a resistor in circuit with each machine, and means including two additional switches for connecting said machines in parallel relation and connecting another resistor in series-circuit relation with the accelerating resistors to effect dynamic braking operation.

4. In a control system, the combination with a plurality of supply-circuit conductors and a plurality of dynamo-electric machines normally disconnected therefrom, of a plurality of resistors, means including seven "main-circuit" switches for effecting series-parallel acceleration of said machines with a resistor in circuit with each machine, and means including two of said switches and two additional switches for connecting said machines in parallel relation and connecting another resistor in series-circuit relation with the accelerating resistors to effect dynamic braking.

5. In a control system, the combination with a plurality of supply-circuit conductors, and a plurality of dynamo-electric machines severally having series-related armatures and field windings, of means for connecting a series circuit including one machine, two resistors and a second machine to the supply-circuit conductors, and two switches for directly connecting the outer armature terminals and the outer field-winding terminals, respectively, under predetermined operating conditions.

6. In a control system, the combination with a supply circuit, of a plurality of dynamo-electric machines severally having armatures and field windings, means for reversing the connections of an armature and of a non-corresponding field winding, a plurality of resistors, means for effecting series-parallel acceleration of said machines with only a portion of said resistors active, and means for effecting electrical braking of said machine with said armature and non-corresponding field winding reversed and with all of said resistors active.

7. In a control system, the combination with a supply circuit, of a plurality of dynamo-electric machines severally having armatures and field windings, means for reversing the connections of an armature and of a non-corresponding field winding, a plurality of resistors, a plurality of switches for effecting series-parallel acceleration of said machines with a resistor in circuit with each machine, and means including two additional switches for connecting said machines in parallel relation and connecting another resistor in series-circuit relation with the accelerating resistors to effect dynamic braking operation, said armature and non-corresponding field winding being reversed.

In testimony whereof, we have hereunto subscribed our names this 14th day of Sept., 1917.

ANDREW H. CANDEE.
HOWARD H. JOHNSTON.